United States Patent
Chen et al.

(10) Patent No.: US 9,094,699 B2
(45) Date of Patent: Jul. 28, 2015

(54) SYSTEM AND METHOD FOR SECURITY KEY TRANSMISSION WITH STRONG PAIRING TO DESTINATION CLIENT

(75) Inventors: Iue-Shuenn Chen, San Diego, CA (US); Kevin Patariu, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 3270 days.

(21) Appl. No.: 10/871,120

(22) Filed: Jun. 18, 2004

(65) Prior Publication Data

US 2005/0177741 A1 Aug. 11, 2005

Related U.S. Application Data

(60) Provisional application No. 60/542,585, filed on Feb. 5, 2004.

(51) Int. Cl.

| | |
|---|---|
| *H04L 29/06* | (2006.01) |
| *H04N 21/254* | (2011.01) |
| *H04L 9/08* | (2006.01) |
| *H04N 7/167* | (2011.01) |
| *H04N 21/2347* | (2011.01) |
| *H04N 21/258* | (2011.01) |
| *H04N 21/266* | (2011.01) |
| *H04N 21/418* | (2011.01) |
| *H04N 21/4623* | (2011.01) |

(Continued)

(52) U.S. Cl.
CPC .......... *H04N 21/2541* (2013.01); *H04L 9/0822* (2013.01); *H04L 9/0836* (2013.01); *H04L 9/0897* (2013.01); *H04N 7/1675* (2013.01); *H04N 21/2347* (2013.01); *H04N 21/25875* (2013.01); *H04N 21/26606* (2013.01); *H04N 21/26613* (2013.01); *H04N 21/4181* (2013.01); *H04N 21/4623* (2013.01); *H04N 21/4627* (2013.01); *H04N 21/63345* (2013.01); *H04N 21/835* (2013.01); *H04L 2209/601* (2013.01)

(58) Field of Classification Search
CPC  H04L 2209/601; H04L 9/0897; H04N 7/162; H04N 7/1675; H04N 7/167
USPC ......... 713/162, 189, 375; 726/26, 27; 380/22, 380/277–279, 222
See application file for complete search history.

(56) References Cited

U.S. PATENT DOCUMENTS 5,309,516 A * 5/1994 Takaragi et al. ................ 380/45
5,920,626 A * 7/1999 Durden et al. ................ 380/210

(Continued)

FOREIGN PATENT DOCUMENTS

| CN | 1254473 A | 5/2000 |
|---|---|---|
| CN | 1471773 | 1/2004 |

(Continued)

*Primary Examiner* — Harunur Rashid
(74) *Attorney, Agent, or Firm* — Sterne, Kessler, Goldstein & Fox P.L.L.C.

(57) ABSTRACT

Systems and methods for security key transmission with strong pairing to a destination client are disclosed. A security key may be generated by an on-chip key generator, an off-chip device, and/or software. A rule may then be paired with the security key and an address associated with the security key. The rule may define permissible usage by a destination module, which is defined by the associated address. The rule may comprise a command word, which may be implemented using a data structure associated with a permissible algorithm type, a security key size, and/or a security key source.

34 Claims, 8 Drawing Sheets

(51) Int. Cl.
*H04N 21/4627* (2011.01)
*H04N 21/6334* (2011.01)
*H04N 21/835* (2011.01)

(56) References Cited

U.S. PATENT DOCUMENTS

| | | | | |
|---|---|---|---|---|
| 6,035,038 | A * | 3/2000 | Campinos et al. | 380/228 |
| 6,144,743 | A * | 11/2000 | Yamada et al. | 380/44 |
| 6,215,878 | B1 * | 4/2001 | Harkins | 380/281 |
| 6,304,659 | B1 * | 10/2001 | Gold et al. | 380/239 |
| 6,512,829 | B1 * | 1/2003 | Nishioka et al. | 380/278 |
| 7,024,553 | B1 * | 4/2006 | Morimoto | 713/163 |
| 7,127,069 | B2 * | 10/2006 | Nguyen | 380/278 |
| 7,143,438 | B1 * | 11/2006 | Coss et al. | 726/11 |
| 7,257,616 | B2 * | 8/2007 | Bass et al. | 709/203 |
| 7,317,798 | B2 * | 1/2008 | Saito | 380/277 |
| 7,493,661 | B2 * | 2/2009 | Liu et al. | 726/28 |
| 2002/0094089 | A1 * | 7/2002 | Kamiya et al. | 380/279 |
| 2002/0174366 | A1 * | 11/2002 | Peterka et al. | 713/201 |
| 2003/0037235 | A1 * | 2/2003 | Aziz et al. | 713/160 |
| 2003/0061405 | A1 * | 3/2003 | Fisher et al. | 709/400 |
| 2003/0108199 | A1 * | 6/2003 | Pinder et al. | 380/200 |
| 2003/0221100 | A1 * | 11/2003 | Russ et al. | 713/153 |
| 2004/0054792 | A1 * | 3/2004 | Pitsos | 709/229 |
| 2004/0076120 | A1 * | 4/2004 | Ishidoshiro | 370/252 |
| 2004/0177369 | A1 * | 9/2004 | Akins, III | 725/31 |
| 2004/0237100 | A1 * | 11/2004 | Pinder et al. | 725/31 |
| 2005/0066355 | A1 * | 3/2005 | Cromer et al. | 725/31 |
| 2005/0076138 | A1 * | 4/2005 | Sterne | 709/238 |
| 2005/0177741 | A1 * | 8/2005 | Chen et al. | 713/189 |

FOREIGN PATENT DOCUMENTS

| | | |
|---|---|---|
| WO | WO-98/43426 A | 10/1998 |
| WO | WO-99/07150 A | 2/1999 |
| WO | WO-02/062054 A | 8/2002 |

* cited by examiner

SYSTEM AND METHOD FOR SECURITY KEY TRANSMISSION WITH STRONG PAIRING TO DESTINATION CLIENT

CROSS-REFERENCE TO RELATED APPLICATIONS/INCORPORATION BY REFERENCE

This application makes reference to, claims priority to, and claims the benefit of U.S. Provisional Application Ser. No. 60/542,585, filed Feb. 5, 2004 and entitled "A Method of Security Key Transmission with Strong Pairing to Destination Client."

The complete subject matter of the above-referenced United States Provisional Patent Application is hereby incorporated herein by reference, in its entirety.

BACKGROUND OF THE INVENTION

The implementation of fee-based video broadcasting requires a conventional conditional access (CA) system to prevent non-subscribers and unauthorized users from receiving signal broadcasts. Cryptography algorithms may be utilized, for example, in content protection in digital set-top box systems and in other systems utilized in fee-based video broadcasting. Security keys may, therefore, play a significant part in the encryption and/or decryption process initiated by a cryptography algorithm. For each cryptography algorithm used in a fee-based video broadcasting system, there may be a set of associated security keys that may be needed by the algorithm. In a typical set-top box System-on-Chip integrated circuit, for example, depending on the security sub-system within the circuit, the security key generation, and the destination module that uses the security key may be far apart within a chip. For example, a security key generation module may not be within the same design block as the destination module that utilizes the security key. The distance between the security key generation module and the destination module may require a special bus to transmit the security key to the appropriate destinations, which may decrease the speed and efficiency of the circuit. The addressability of the key to the destination module is currently the only known pairing between a security key generation module and a security key destination module.

A complete CA system usually includes three main functions: a scrambling/descrambling function, an entitlement control function, and an entitlement management function. The scrambling/descrambling function is designed to make the program incomprehensible to unauthorized receivers. Scrambling may be applied commonly or separately to the different elementary stream components of a program. For example, the video, audio and data stream components of a TV program may be scrambled in order to make these streams unintelligible. Scrambling may be achieved by applying various scrambling algorithms to the stream components. The scrambling algorithm usually utilizes a secret key, called a control word. Once the signal is received, the descrambling may be achieved by any receiver that holds the secret key or the control word, used by the scrambling algorithm prior to transmission. Scrambling and descrambling operations, in general, do not cause any impairment on the quality of the signals. The commonly used algorithms for scrambling digital data in CA systems are symmetric key ciphers. The control word used by the scrambling algorithm is a secret parameter known only by the scrambler and the authorized descramblers. In order to preserve the integrity of the encryption process, the control word has to be changed frequently in order to avoid any exhaustive searches by an unauthorized user, which is intended to discover the control word.

The rights and associated keys needed to descramble a program are called entitlements. The entitlement control function provides the conditions required to access a scrambled program together with the encrypted secret parameters enabling the signal descrambling process for the authorized receivers. This data is broadcasted as conditional access messages, called entitlement control messages (ECMs). The ECMs carry an encrypted form of the control words, or a means to recover the control words, together with access parameters, such as identification of the service and of the conditions required for accessing this service. Upon receipt of an ECM, the receiver transmits the encrypted control word and the access characteristics to the security device, for example, a smart card. After it has been confirmed that a user is authorized to watch the specific program, the security device checks the origin and integrity of the control word and the access parameters before decrypting the control word and sending it to the descrambler.

The entitlement management function is associated with distributing the entitlements to the receivers. There are several kinds of entitlements matching the different means to "buy" a video program. These entitlements are also broadcasted as conditional access messages, called entitlement management messages (EMMs). The EMMs are used to convey entitlements or keys to users, or to invalidate or delete entitlements or keys. The entitlement control functions and the entitlement management functions require the use of secret keys and cryptographic algorithms. For example, most modern conditional access systems utilize a smart card to store secret keys and to run cryptographic algorithms safely.

Most CA systems scramble and/or randomize transmitted data bits so that unauthorized decoders cannot decode the transmitted data bits. Authorized decoders are delivered a key that initializes the circuit that inverts the data bit randomization. As used herein, the term scrambling may be associated with the pseudo-random inversion of data bits based on a key that is valid for a short period of time. In addition to scrambling, a key may also be transformed into an encrypted key in order to protect it from any unauthorized users. From a cryptographic point of view, this transformation of the key to an encrypted key is the only part of the system that protects the data from a highly motivated pirate or a hacker. As a result, the scrambling portion of the process alone, in the absence of key encryption, may be easily defeated. A CA system is usually associated with a system that implements key encryption and distribution of the encrypted key. The general requirements that a CA system with scrambling and encryption functionality must meet for digital video delivery are as follows: protection against signal piracy, efficient scrambling, flexibility, variety of supported formats, and ease of implementation.

With regard to robust protection against signal piracy, it must be difficult for a third party to perform unauthorized reception. In addition, the scrambled signal content must not be understandable. Efficient scrambling of all kinds of signals, as in multimedia broadcasts for example, must be possible and quality must not deteriorate (perceptibly) when these signals are being restored (quality signal restoration). A CA system is also flexible as it may be exercised on an elementary stream-by-stream basis, including the ability to selectively scramble bit streams in a program, if it is desired. Further, various business formats, such as multi-channel services and billing schemes, may be supported with low operating costs, and a private encryption system may be used, for example, by each program provider that is part of the CA system. A CA system with scrambling and encryption functionality may be implemented in standard consumer devices, which also ensures cost effective receivers.

With either a conditional access system or a copy protection system, private (secure) keys are nearly always used for scrambling and descrambling high-value content or for protecting highly sensitive transactions. In a CA system, the content scrambling key must be protected. To ensure proper functionality, the CA system should perform scrambling according to the properties of the data for transmission. In addition, the CA system should change the key regularly to maintain the security of the scrambling system, and transmit the key information to the receiver in a secure manner using a hierarchical encryption system. Thirdly, for the purpose of operating fee-based broadcasting service, reception should be controlled according to the details of each user's subscription.

Figure 1:
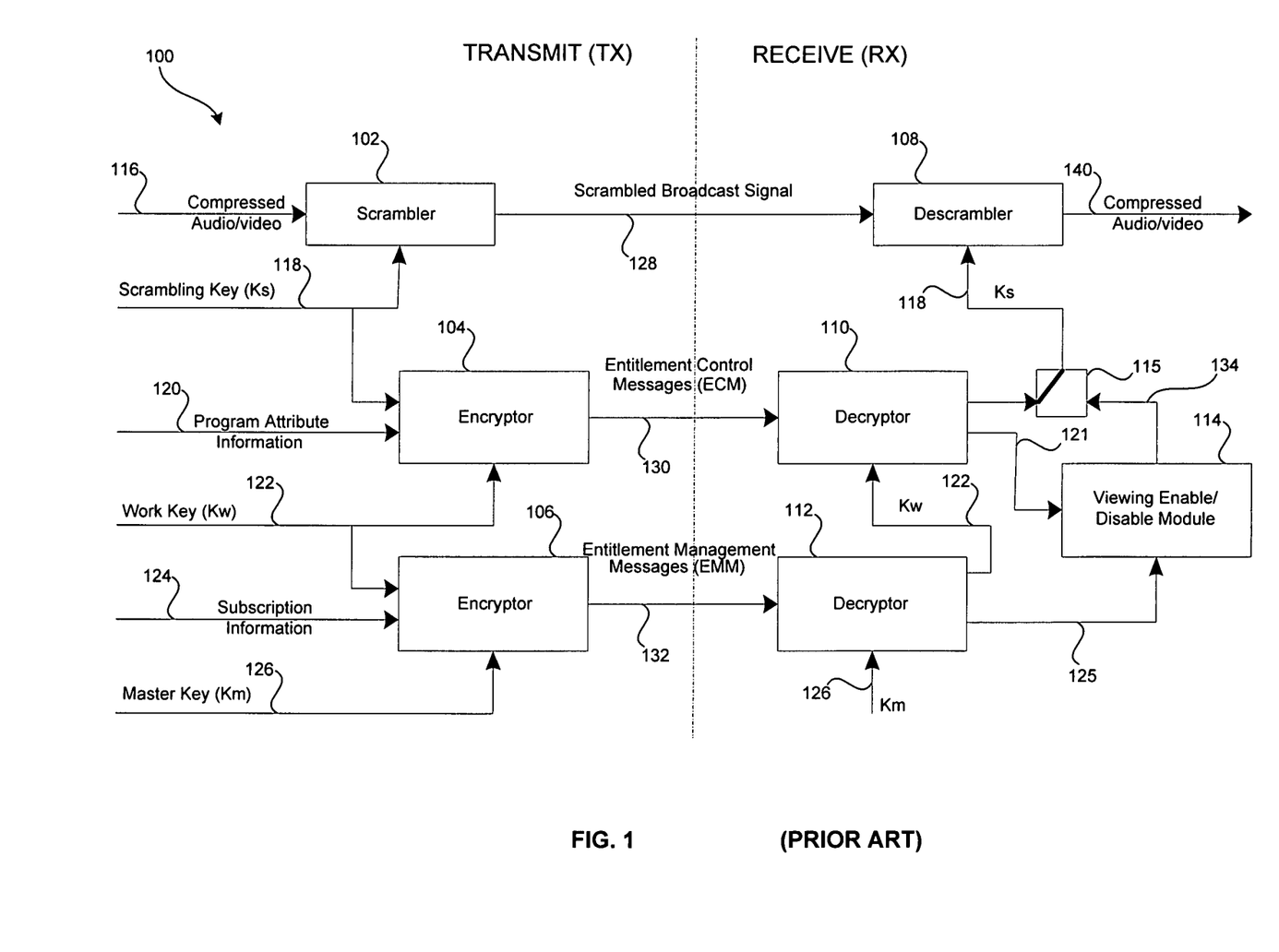
FIG. 1 is a block diagram illustrating conditional access system utilizing a conventional key ladder system.

Such CA system may be achieved in various ways depending on types of services, required functions, and security. FIG. 1 is a block diagram illustrating a conditional access system utilizing a conventional key ladder system. The configuration of the CA system 100 in FIG. 1 has been recommended by International Telecommunications Union—Radiocommunication Sector (ITU-R). Referring to FIG. 1, there is shown a block diagram of an exemplary conditional access system 100, which may include a scrambler 102, a descrambler 108, encryptors 104 and 106, decryptors 110 and 112, a switch 115, and a viewing enable/disable circuit 114. On the transmit side of the diagram, TX, the compressed audio/video signal 116 may be scrambled by the scrambler 102, utilizing a scrambling key Ks 118, in order to obtain a scrambled broadcast signal 128. Program attribute information 120 may be encrypted by the encryptor 104, utilizing a work key Kw 122, to obtain the entitlement control messages 130. Program subscription information 124 may be encrypted by the encryptor 106, utilizing a master key 126, to obtain the entitlement management messages 132.

During signal scrambling in the CA system 100, the scrambling key Ks 118 determines the scrambling pattern. It is common to change the scrambling key at fixed intervals of time, such as every few seconds, to maintain a secure system. The scrambling key 118 must, therefore, be continuously transmitted to the subscriber's receiver. This is achieved in the CA system 100 by encrypting the scrambling key 118 by the encryptor 104 and transmitting it within the entitlement control messages 130. The ECM 130 may also include the program attribute information 120. The program attribute information 120 may be utilized, for example, for determining whether a subscriber is entitled to view a program on the basis of his or her subscription. To prevent the ECM 130, which includes the scrambling key 118, from being understood by a third party, the ECM 130 is encrypted by the encryptor 104 before transmission, by utilizing the work key Kw 122. The work key 122 may be updated on a monthly or yearly basis. The work key 122 is sent to the receiver through the entitlement management messages 132, together with the subscription information 124. The subscription information 124 may also contain any subscription updates for the specific subscriber.

Besides being transmitted in-band, the EMM 132 may be transmitted out-of-band utilizing other media like the Internet, telephone lines, a signaling network, or a smart card. Prior to transmission, the EMM 132 is encrypted by a master key Km 126. A master key is unique to each receiver and its security must be commonly managed among different broadcast operators that use the same type of receiver. This normally may be accomplished by setting up an organization for uniform key management. For example, in the CA system 100 illustrated in FIG. 1, the content scrambling key 118 is protected by the work key 122, which is in turn protected by the master key 126. This key protection "chain" is, sometimes, referred to as a key ladder.

On the receive side of the diagram, RX, the same key ladder is utilized in order to decrypt the necessary secure keys and scrambled broadcast audio/video signals 128. The master key 126 may be utilized with the decryptor 112 in order to decrypt the EMM 132 and the work key 122. As a result, the work key 122 is obtained as one of the outputs from the decryptor 112. The decrypted work key 122 may then be utilized by the decryptor 110 to decrypt the ECM 130 and the scrambling key 118. As a result, the scrambling key 118 is obtained as one of the outputs from the decryptor 110. The decrypted scrambling key 118 may then be utilized by the descrambler 108 to descramble the scrambled broadcast signal 128 and obtain the compressed audio/video output 140.

Access to the compressed audio/video output 140 by a user is determined in accordance with the user's subscription information 124 and the program attribute information 120. The decryptor 112 decrypts the EMM 132 to obtain decrypted subscription information 125. The decryptor 110 decrypts the ECM 130 to obtain decrypted program attribute information 120. The viewing enable/disable module 114 receives the decrypted subscription information 125 and the decrypted program attribute information 121 and may then determine whether or not a user is entitled to receive the compressed audio/video output 140. If the user is entitled to receive the compressed audio/video output 140 (for example, the user has a valid subscription for a given programming channel), then the viewing enable/disable module 114 issues a control signal 134 activating the switch 115. Once the switch 115 is activated, this allows for the decrypted scrambling key 118 to be entered into the descrambler 108, which in turn allows for the descrambling of the compressed audio/video output 140.

Figure 2:
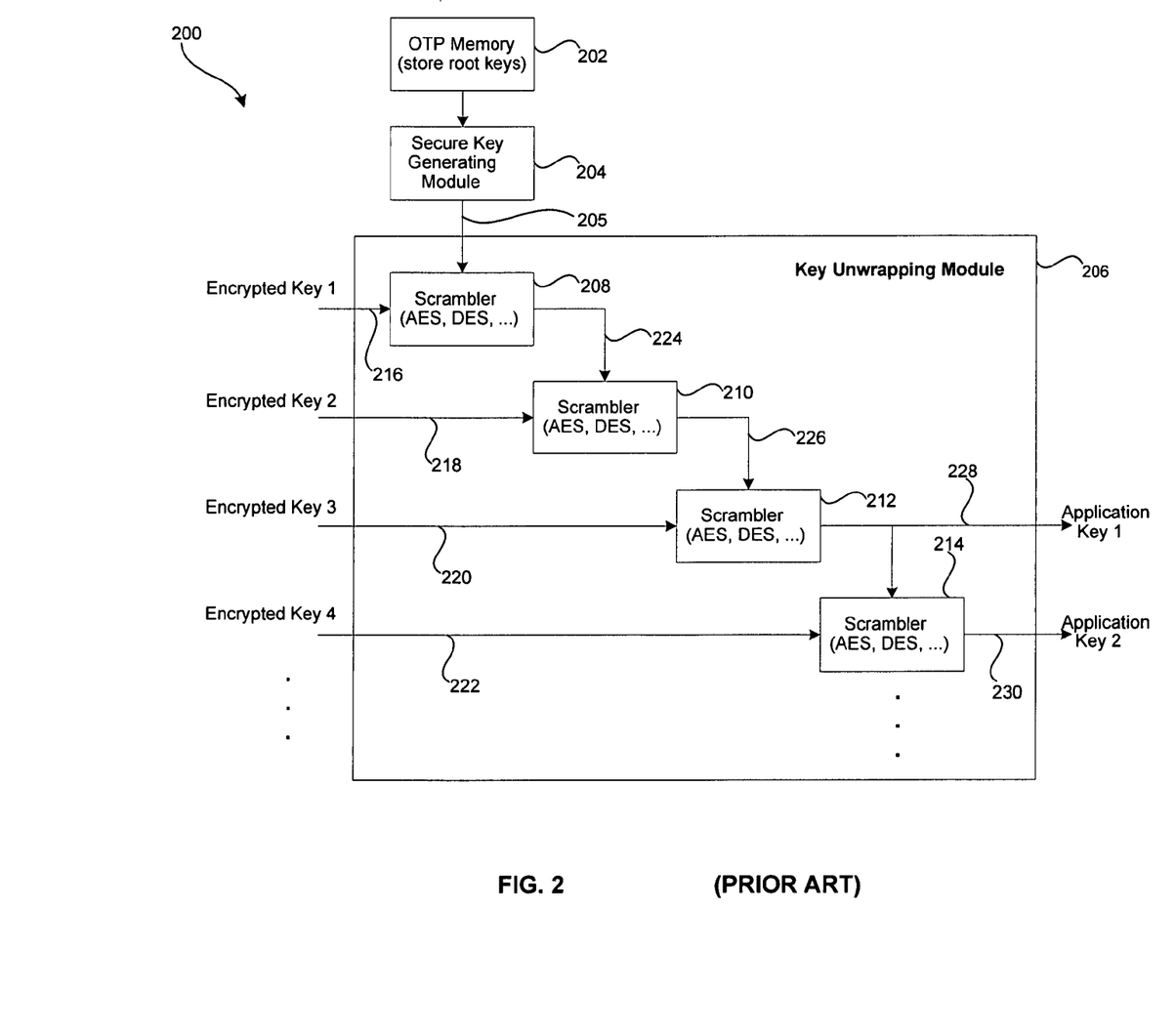
FIG. 2 is a block diagram illustrating secure key unwrapping in a conventional key ladder system.

FIG. 2 is a block diagram illustrating secure key unwrapping in a conventional key ladder system. Referring to FIG. 2, the key ladder system 200 may comprise a one time programmable (OTP) memory 202, a secure key generating module 204 and a key unwrapping module 206. The key unwrapping module 206 may comprise scramblers 208, 210, 212 and 214. Each of the scramblers 208, 210, 212 and 214 may utilize a symmetric encryption algorithm, for example a Data Encryption Standard (DES), a 3DES, or an Advanced Encryption Standard (AES) type of algorithm, in order to descramble an encrypted key input. The OTP memory 202 in the key ladder system 200 may be adapted to store a root key, for example a key such as the master key 126 in FIG. 1. The root key stored in the OTP memory 202 may be further protected by the secure key-generating module 204. The secure key-generating module 204 may comprise suitable logic, circuitry, and/or code that may be adapted to scramble, or otherwise further enhance the security of the root key stored in the OTP memory 202.

The key unwrapping module 206 may be adapted to "unwrap," or descramble, various application keys, for example, application key 1, 228, and application key 2, 230. In order to achieve this, the key unwrapping module 206 may utilize several encrypted keys, for example, encrypted key 1, 216, encrypted key 2, 218, encrypted key 3, 220, and encrypted key 4, 222. Once the root key stored in the OTP memory 202 is scrambled by the secure key-generating module 204, the scrambled root key 205 may be utilized by the scrambler 208 in order to decrypt the encrypted key 1, 216, and obtain a decrypted key 224. The decrypted key 224 may comprise, for example, a work key. The decrypted key 224 may be utilized by the scrambler 210 in order to decrypt encrypted key 2, 218, and obtain the decrypted key 226. The decrypted key 226 may comprise, for example, a scrambling key.

The decrypted key 226 may be utilized by the scrambler 212 in order to decrypt encrypted key 3, 220, and obtain the decrypted application key 1, 228. Similarly, the decrypted application key 228 may be utilized by the scrambler 214 in order to decrypt encrypted key 4, 222, and obtain the decrypted application key 2, 230. Decrypted application keys 228 and 230 may be further utilized for various functions, for example, for copy protection of broadcast signals. The key ladder in the key unwrapping module 206 may be adapted to have varying levels of protection by increasing the number of the encrypted keys and the corresponding scramblers, and by utilizing each previously decrypted application key in a subsequent decryption of a following encrypted key. The key ladder may be utilized to "unwrap" a master key, a work key and a scrambling key. The master key, work key and scrambling key may then be utilized to decrypt one or more application keys.

Even though the key unwrapping module 206 may provide increasing level of protection by increasing the number of scramblers and encrypted keys, it may be difficult to determine whether or not the received encrypted keys in the key ladder system 200 of FIG. 2 have been manipulated by unauthorized parties.

When encrypted data is transmitted over an insecure channel, the transmitting and/or the receiving party may need the ability to monitor such communication and obtain verification of the identity of the other party, and of the integrity and origin of the encrypted data that was transmitted.

With either a conditional access system or a copy protection system, security keys may be generated either on the transmit or the receive side of a fee-based video broadcasting system. The generated security keys may be utilized in the encryption/decryption of other keys, for example. In order for a security key to be properly utilized by a destination module, the security key may be paired with address information of the destination module it is intended for. The security key data path from generation, distribution and use by a destination module, however, may be susceptible to security breach since the only pairing used is the addressability of the security key to the destination module.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a system and method for security key transmission with strong pairing to destination client. Aspects of the method may include pairing a rule with a security key and its associated address, and sending the rule along with the security key and the associated address to a destination. The rule may define permissible usage by a destination module defined by the associated address and may comprise a command word, which may be implemented by a data structure. The data structure may be associated with a permissible algorithm type, a security key size, and/or a security key source. A failure report may be received from the destination if the sent rule is violated. The security key may be generated by an on-chip key generator, an off-chip device, and/or software. The rule, along with the security key and the associated address, may be serially transmitted to one or more destinations. The rule may be compared with an algorithm configuration at the at least one destination. If the rule does not match the algorithm configuration, an error message may be generated by the destination. If the rule does not match the algorithm configuration, the security key may be invalidated by the destination.

Another aspect of the invention may provide a machine-readable storage, having stored thereon, a computer program having at least one code section executable by a machine, thereby causing the machine to perform the steps as described above for security key transmission with strong pairing to a destination client.

In yet a different aspect of the invention, a system for security key transmission with strong pairing to a destination client may include a rule paired with a security key and its associated address, and a serializer that sends the rule along with the security key and the associated address to at least one destination. The rule may define permissible usage by a destination module defined by the associated address and may comprise a command word. A data structure may be utilized to define various attributes of the command word. The data structure may be associated with a permissible algorithm type, a security key size, and/or a security key source. A failure report may be received from the destination if the sent rule is violated. A generator comprising an on-chip key generator, an off-chip device, and/or software, may be used to generate the security key. The serializer may serially transmit the rule along with the security key and the associated address to the at least one destination. A destination module processor may compare the rule with an algorithm configuration at the at least one destination. If the rule does not match the algorithm configuration, the destination module processor may generate an error message and may invalidate the security key.

These and other advantages, aspects and novel features of the present invention, as well as details of an illustrated embodiment thereof, will be more fully understood from the following description and drawings.

DETAILED DESCRIPTION OF THE INVENTION

In conventional security key generation and transmission systems, a generated security key may be associated only with an address indicating the destination module that will utilize the security key. Strong pairing may be achieved by pairing the security key and its associated address with a security command, and subsequently transmitting the security key together with the security command and the associated address to a destination module. The security command may then be utilized by the destination module to ascertain the authenticity of the security key and compliance with applicable pairing rules.

Certain aspects of the invention may be found in a system and method for security key transmission with strong pairing to destination client. A security key may be generated by an on-chip key generator, an off-chip device, and/or software. A rule may then be paired with the security key and an address associated with the security key. The rule may define permissible usage by a destination module, which is defined by the associated address. The rule may comprise a command word, which may be implemented using a data structure associated with a permissible algorithm type, a security key size, and/or a security key source. The rule, the security key and the address may be transmitted to the destination module where the rule may be compared with an algorithm configuration. If the rule does not match the algorithm configuration, an error message may be generated by the destination module, and the security key may be invalidated. Strong pairing, therefore, may be achieved for the entire security key data path, including generation, distribution and use by a destination module, by pairing a rule (or a security word) with a security key and its corresponding address associated with a destination module.

Figure 3:
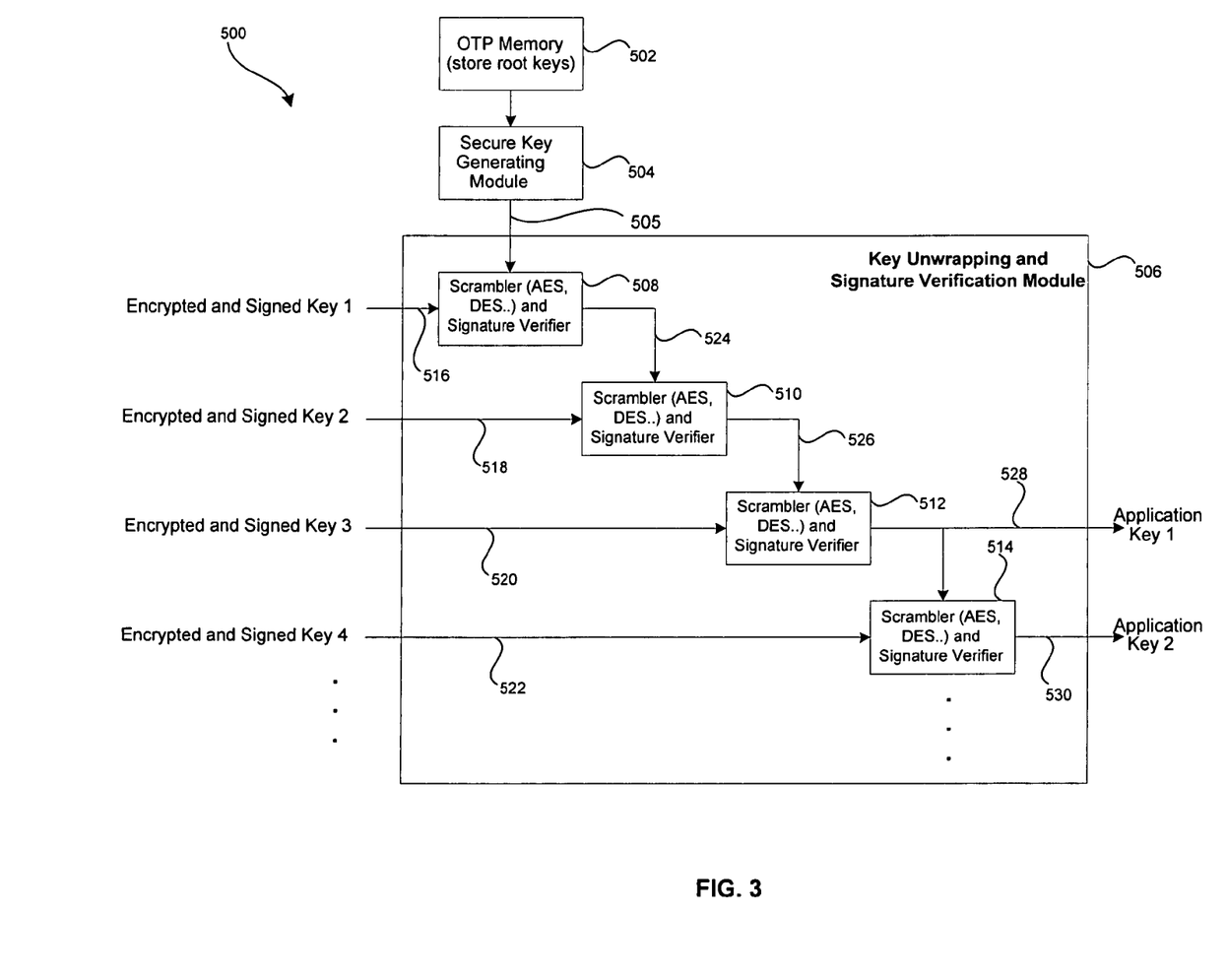
FIG. 3 is a block diagram illustrating secure key unwrapping and signature verification system, in accordance with an embodiment of the present invention.

FIG. 3 shows a block diagram illustrating a secure key unwrapping and signature verification system, in accordance with an embodiment of the present invention. Referring to FIG. 3, the key ladder system 500 may comprise a one time programmable (OTP) memory 502, a secure key generating module 504 and a key unwrapping and signature verification module 506.

The key unwrapping and signature verification module 506 may be adapted to "unwrap", or descramble, various application keys, for example, application key 1, 528, and application key 2, 530. In order to achieve this, the key unwrapping and signature verification module 506 may utilize several encrypted and signed keys, for example, encrypted and signed key 1, 516, encrypted and signed key 2, 518, encrypted and signed key 3, 520, and encrypted and signed key 4, 522. In accordance with an aspect of the present invention, the encrypted and signed keys 516, 518, 520 and 522 may have been initially signed by a transmitting entity utilizing an asymmetric encryption algorithm, such as a public key algorithm, for example a Rivest-Shamir-Adleman (RSA), a Digital Signature Algorithm (DSA), or an Elliptic Curve Cryptography (ECC) type of algorithm. The signed keys may then have been encrypted utilizing a symmetric encryption algorithm, such as a DES, a 3DES, or an AES type of algorithm.

The key unwrapping and signature verification module 506 may comprise scrambler and signature verifiers 508, 510, 512 and 514. Each of the scrambler and signature verifiers 508, 510, 512 and 514 may comprise suitable logic, circuitry and/or code that may be adapted to utilize a symmetric encryption algorithm, for example a DES, a 3DES, or an AES type of algorithm, in order to descramble an encrypted signed key input. Each of the scrambler and signature verifiers 508, 510, 512 and 514 may also be adapted to utilize a public key algorithm, for example an RSA, a DSA, or an EC type of algorithm, in order to verify a decrypted signed key.

The OTP memory 502 in the key ladder system 500 may be adapted to store a root key, for example a master key. The root key stored in the OTP memory 502 may be further protected by the secure key-generating module 504. The secure key-generating module 504 may comprise suitable logic, circuitry and/or code that may be adapted to scramble, or otherwise further enhance the security of the root key stored in the OTP memory 502.

Once the root key stored in the OTP memory 502 is scrambled by the secure key-generating module 504, the scrambled root key 505 may be utilized by the scrambler and signature verifier 508 in order to decrypt, and verify the signature of, the encrypted and signed key 1, 516. In this way, the generated decrypted key 524 may be verified. The decrypted and verified key 524 may comprise, for example, a work key. The decrypted and verified key 524 may be utilized by the scrambler 510 in order to decrypt, and verify the signature of, encrypted and signed key 2, 518, and to obtain the decrypted and verified key 526. The decrypted and verified key 526 may comprise, for example, a scrambling key.

The decrypted and verified key 526 may be utilized by the scrambler 512 in order to decrypt, and verify the signature of, encrypted and signed key 3, 220, and to obtain the decrypted and verified application key 1, 528. Similarly, the decrypted and verified application key 528 may be utilized by the scrambler 514 in order to decrypt, and verify the signature of, encrypted and signed key 4, 522, and to obtain the decrypted and verified application key 2, 530. Decrypted and verified application keys 528 and 530 may be further utilized for various functions, for example, for copy protection of broadcast signals. In accordance with an aspect of the present invention, the key ladder in the key unwrapping and signature verification module 506 may be adapted to have varying levels of protection by increasing the number of the encrypted and signed keys and the corresponding scramblers, and by utilizing each previously decrypted and verified application key in a subsequent decryption of a following encrypted and signed key. The key ladder may be utilized to "unwrap" a signed and encrypted master key, a signed and encrypted work key and a signed and encrypted scrambling key. The master key, work key and scrambling key may then be utilized to decrypt one or more application keys.

In accordance with an embodiment of the present invention, strong pairing may be utilized in the secure key unwrapping and signature verification system 500. More specifically, strong pairing may be utilized along the security key datapath from the OTP memory 502, where root keys are stored, up until application keys 528 and 530 are generated in the key unwrapping and signature verification module 506.

Figure 4A:
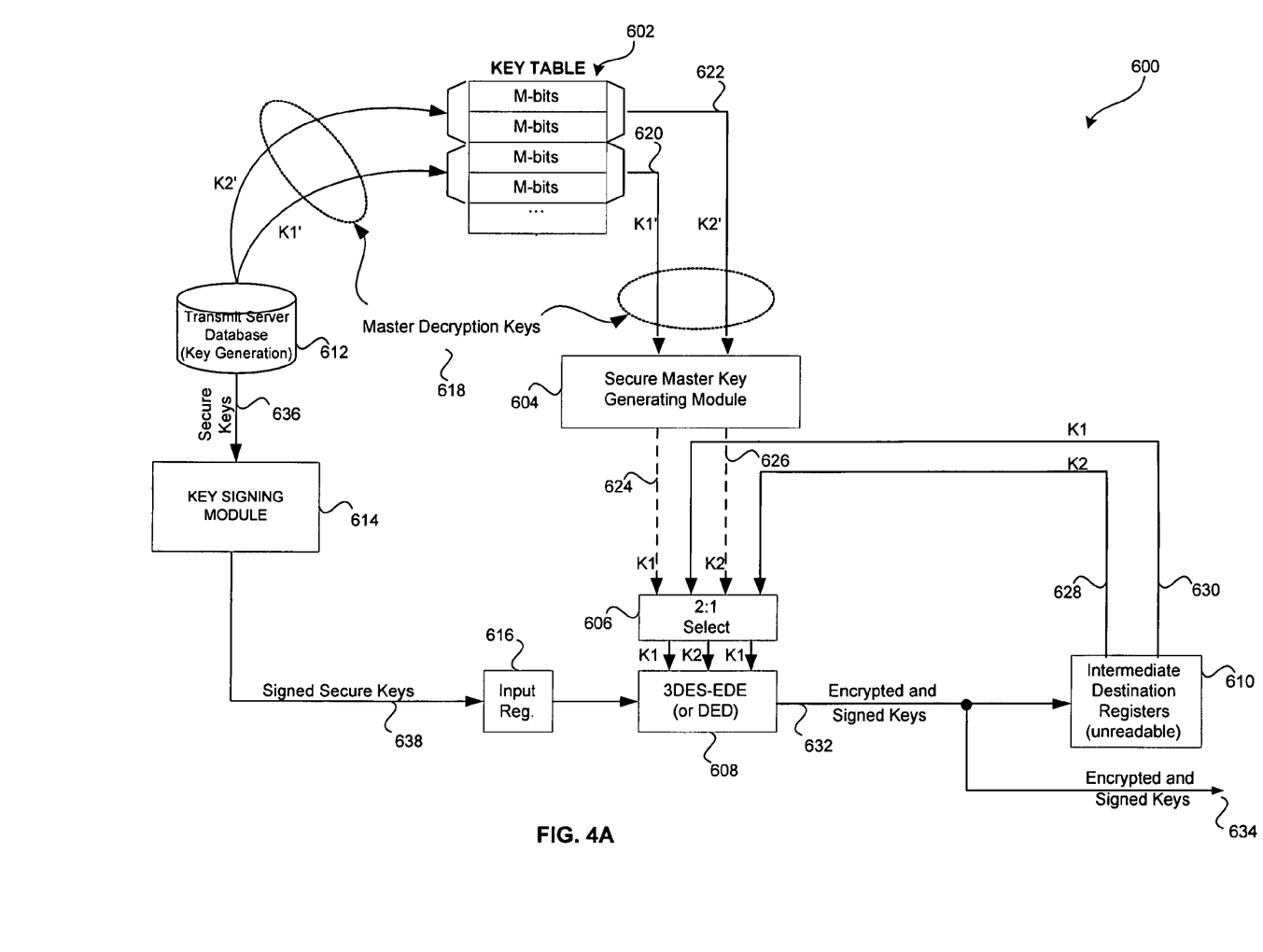
FIG. 4A is a block diagram of an exemplary system for secure key generation, secure key signing and secure key encryption, in accordance with an embodiment of the present invention.

FIG. 4A illustrates a block diagram of an exemplary system for secure key generation, secure key signing and secure key encryption, in accordance with an embodiment of the present invention. Referring to FIG. 4A, the exemplary system 600 may comprise a key table 602, a transmit server database 612, a key signing module 614, an input register 616, a secure master key generating module 604, a selector 606, an encryptor 608, and intermediate destination registers 610.

The transmit server database 612 may comprise suitable logic, circuitry and/or code that may be adapted to generate a plurality of secure keys, for example, master decryption keys 618. Master decryption keys 618 may comprise a master key K1' 620 and master key K2' 622. In accordance with an aspect of the present invention, the master decryption keys 618 may be utilized in the encryption and decryption of one or more secure keys, for example, a work key and/or a scrambling key.

Once master decryption keys 618 are generated by the transmit server database 612, the master decryption keys 618 may be stored in a key table 602. Each of the master decryption keys 620 and 622 may comprise a fixed number of bits. For example, master decryption keys 620 and 622 may each occupy two M-bit cells in the key table 602. The key table 602 may be part of a random access memory (RAM), such as a DRAM or SRAM, for example. The key table 602 may also be adapted to store a plurality of master decryption keys.

Once the master decryption keys are stored in the key table 602, the master decryption keys 618 may be sent to the secure master key generating module 604. The secure master key generating module 604 may comprise suitable logic, circuitry and/or code that may be adapted to further enhance the security of master decryption keys K1' 620 and K2' 622. In accordance with an aspect of the present invention, the secure master key generating module 604 may comprise an encryptor or a scrambler. The secure master key generating module 604 may enhance the security of master decryption keys K1' 620 and K2' 622, and may generate a secure master decryption key K1 624 and a secure master decryption key K2 626.

The transmit server database 612 may also generate a plurality of secure keys 636, which may be communicated from the transmit server database 612 to the key signing module 614. The key-signing module 614 may comprise suitable logic, circuitry and/or code that may be adapted to "sign" the secure keys 636 and generate signed secure keys 638. In accordance with an aspect of the present invention, the key-signing module may utilize a symmetric encryption algorithm and/or an asymmetric encryption algorithm to generate the signed secure keys 638. The signed secure keys 616 may then be stored in an input register 616, prior to being communicated to the encryptor 608.

The selector 606 may comprise suitable logic, circuitry and/or code that may be adapted to select from one or more inputs and generate one or more outputs. In accordance with an aspect of the present invention, the selector 606 may be a 2:1 selector and may generate three outputs from any two received inputs. For example, the secure master decryption keys 624 and 626 may be utilized by the selector 606 as inputs to generate an output with the secure master decryption key 624 selected twice and the secure master decryption key 626 selected once.

The encryptor 608 may comprise suitable logic, circuitry and/or code that may be adapted to encrypt any of the signed secure keys 638. In accordance with an aspect of the present invention, the encryptor 608 may comprise a 3DES-Encrypt-Decrypt-Encrypt (EDE) or Decrypt-Encrypt-Decrypt (DED) encryption engine. The encryptor 608 may utilize the secure master decryption key output from the selector 606 and encrypt the signed secure keys 638 to obtain encrypted and signed keys 632.

The encrypted and signed keys 632 may be copied to intermediate destination registers 610 and may be subsequently utilized by the selector 606 and the encryptor 608 for encryption of subsequent signed secure keys 638. For example, the secure master decryption keys 624 and 626 may be utilized by the selector 606 and the encryptor 608 only once, for the encryption of a first pair of signed secure keys received by the encryptor 608. The resulting encrypted and signed secure keys 628 and 630 may be stored in intermediate destination registers 610 prior to their utilization by the selector 606 and the encryptor 608 for the encryption of a second, subsequent pair of signed secure keys.

As the key generation, signing and encryption system 600 generates encrypted and signed keys 632, the secure key ladder protection increases since the number of generated encrypted and signed keys 632 increases. As the encrypted and signed keys 632 are generated, they may be transmitted from an output location 634.

In accordance with an embodiment of the present invention, strong pairing may be utilized in the exemplary system 600 for secure key generation, secure key signing and secure key encryption. More specifically, strong pairing may be utilized along the security key data path from the moment security keys are generated by the transmit server database 612, or the secure master key generating module 604, until encrypted and signed security keys are transmitted out from the output location 634.

Figure 4B:
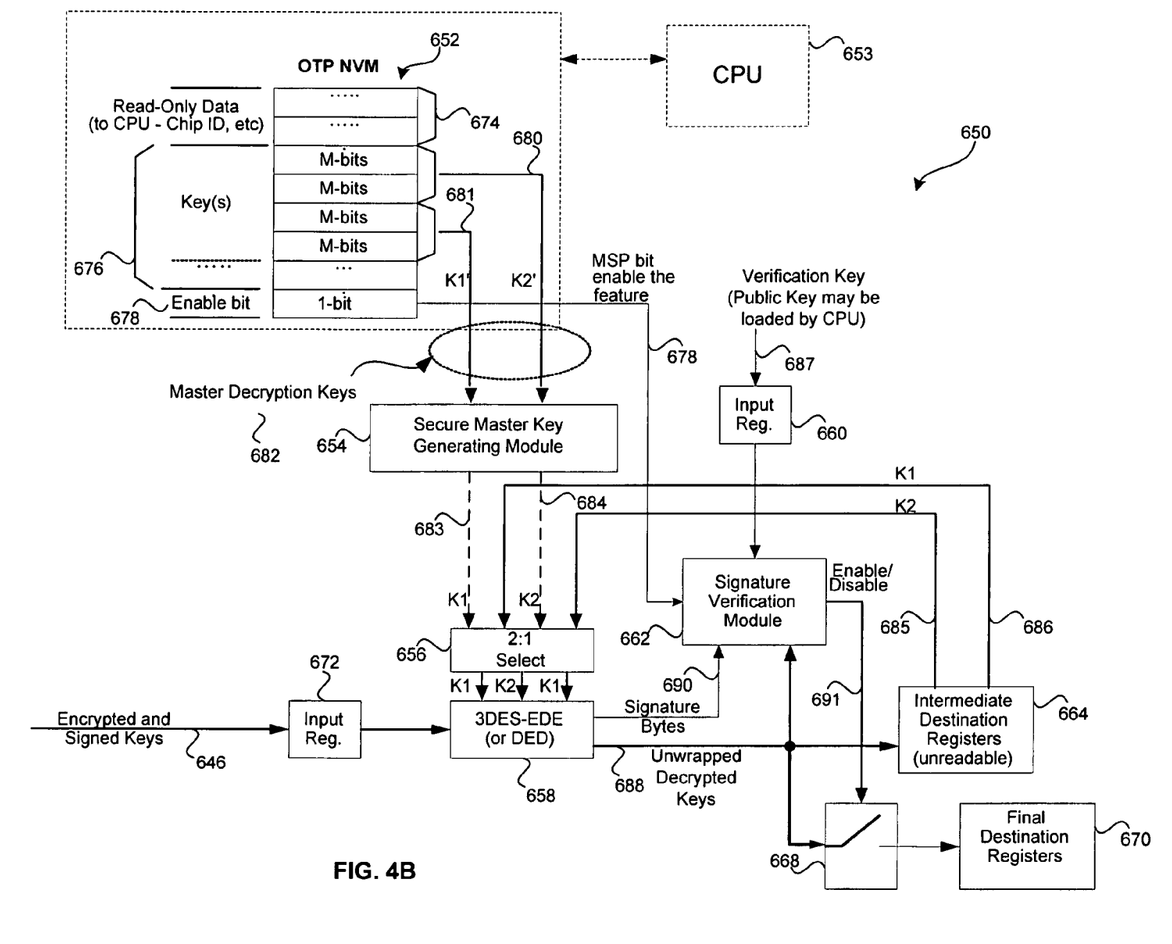
FIG. 4B is a block diagram of an exemplary system for secure key decryption and secure key signature verification, in accordance with an embodiment of the present invention.

Referring now to FIG. 4B, there is illustrated a block diagram of an exemplary system for secure key decryption and secure key signature verification in accordance with an embodiment of the present invention. The exemplary system for secure key decryption and secure key signature verification 650 may comprise a one-time programmable non-volatile memory (OTP NVM) 652, a secure master key generating module 654, a CPU 653, an input register 672, a selector 656, a decryptor 658, an input register 660, a signature verification module 662, an intermediate destination register 664, a switch 668 and final destination registers 670.

The OTP NVM 652 may comprise a random access memory (RAM), such as a DRAM or SRAM, for example. The OTP NVM 652 may be adapted to store, for example, read-only data 674, keys 676, and an enable bit 678. The keys 676 may comprise master decryption keys 681 and 680. The master decryption keys 681 and 680 may each occupy, for example, an even number of bits in the OTP NVM 652. More specifically, the master decryption keys 680 and 681 may each occupy two M-bit cells in the OTP NVM 652. The read-only data 674 of the OTP NVM 652 may comprise chip identification information and other read-only information that may be accessed by the CPU 653. The CPU 653 may be, for example, a microprocessor, a microcontroller or other type of processor.

The master decryption keys 680 and 681 may be sent to the secure master key generating module 654. The secure master key generating module 654 may comprise suitable logic, circuitry and/or code that may be adapted to further enhance the security of the master decryption keys 680 and 681. In accordance with an aspect of the present invention, the secure master key generating module 654 may comprise an encryptor, or a scrambler, that may receive master decryption keys 682 as input. Master decryption keys 682 may comprise master decryption key 680 and master decryption key 681. The secure master key generating module 654 may enhance the security of master decryption key 680 and master decryption key 681 and may generate a secure master decryption key K1 683 and secure master decryption key K2 684.

The selector 656 may comprise suitable logic, circuitry and/or code that may be adapted to select from one or more inputs and generate one or more outputs. In accordance with an aspect of the present invention, the selector 656 may be, for example, a 2:1 selector and may generate three outputs from any two received inputs. For example, the secure master decryption keys K1 and K2, 683 and 684 respectively, may be utilized by the selector 656 as inputs to generate an output. For example, the secure master decryption key 683 may be selected twice and the secure master decryption selected once.

The secure key decryption and secure key signature verification system 650 may be adapted to receive encrypted and signed keys 646. The encrypted and signed keys 646 may be generated, for example, by a secure key generation, secure key signing and secure key encryption system, such as the system illustrated on FIG. 6A. Once received by the secure key decryption and secure key verification system 650, the encrypted and signed keys 646 may be stored in an input register 672. The encrypted and signed keys 646 may then be transmitted to the decryptor 658. In accordance with an aspect of the present invention, the encrypted and signed keys 646 may comprise multiples of 64-bits, for example, and may include at least one of an encrypted key, a key destination and/or a key signature.

The decryptor 658 may comprise suitable logic, circuitry and/or code that may be adapted to decrypt any of the encrypted and signed keys 646. In accordance with an aspect of the present invention, the encryptor 658 may comprise a 3DES-Encrypt-Decrypt-Encrypt (EDE) and/or Decrypt-Encrypt-Decrypt (DED) decryption engine. The decryptor 658 may utilize the secure master decryption keys K1 and K2, 683 and 684 respectively, generated as an output of the selector 656. The decryptor 658 generates as output unwrapped decrypted keys 688 and signature bytes 690.

The unwrapped decrypted keys 688 may be communicated to the intermediate destination registers 664, and may subsequently be utilized by the selector 656 and the decryptor 658 for decryption of subsequent encrypted and signed keys 646. For example, the secure master decryption key K1 683 and the secure master decryption key K2 684 may be utilized by the selector 656 and the decryptor 658 only once, for the decryption of a first pair of encrypted and signed keys 646 that may be received by the decryptor 658. The resulting unwrapped decrypted keys K1 686 and K2 685 may be stored in the intermediate destination registers 664. The unwrapped decrypted keys 685 and 686 may then be utilized by the selector 656 and decryptor 658 for the decryption of a second subsequent pair of encrypted and signed keys 646 that may be received by the decryptor 658. This loop process may continue until all encrypted and signed keys of the received key ladder are unwrapped and decrypted.

After decryption of the encrypted and signed keys 646 by the decryptor 658, the signature bytes 690 of each of the encrypted and signed keys are generated as output from the decryptor 658. The signature bytes 690 may then be entered into the signature verification module 652. The signature verification module 652 may comprise suitable logic, circuitry and/or code but may be adapted to verify the authenticity of the signature bytes 690. In accordance with an aspect of the present invention, the signature verification module 662 may utilize an asymmetric encryption algorithm, such as a public key encryption algorithm, in order to verify the received signature bytes 690. A verification key 687 may be loaded by the CPU 653. A verification key 687 may comprise for example, a public key that may be utilized to verify the signature 690. The verification key 687 may be initially stored in an input register 660. The signature verification module 662 may utilize the verification key (public key) 687 in order to verify the received signature 690. As a result, an enabled/disabled signal 691 may be generated by the signature verification module 662. The enabled/disabled signal 691 may then be communicated to the switch 668.

The switch 668 may receive the unwrapped decrypted key 688 and may allow, or reject, a further transmission of the unlocked decrypted keys 688 through the final destination registers 670. If the command 691 comprises an enable command, the unwrapped decrypted key 688 may be transmitted to the final destination registers 670 for any further processing. If the command 691 comprises a disable command, then the unwrapped decrypted keys 688 may not be transmitted to the final destination registers 670. A disable command 691 may be generated, for example, if the signature verification module 690 ascertains that the signature 690 is not verified. The signature 690 may be unverifiable if, for example, the encrypted and signed keys 646 had been manipulated by an attacker during their transmission to the secure key decryption and secure key verification system 650. Verification of the signature 690 by the signature verification module 662 may be enabled or disabled with the help of the enable bit 678. The bit 678 may comprise a multi-stage programming (MSP) bit. For example, an enable bit 678 may be set to a predetermined value so that the signature verification module 662 is activated and the signature 690 may be verified.

In an embodiment of the present invention, cryptography algorithms may be utilized to encrypt and/or decrypt data. In addition, security keys may be utilized to enhance the authentication process. A strong pairing may exist between the various keys and the destination modules where the keys may be used. This strong pairing may be utilized to add more security and authenticity in the transmission of a security key to the destination module associated with the key. For example, strong pairing may be utilized in the secure key decryption and secure key verification system 650. More specifically, strong pairing may be utilized along the security key data path from the moment security keys are received by the input register 672, or generated by the secure master key generating module 654, until unwrapped and decrypted keys are communicated to the final destination registers 670.

Figure 5:
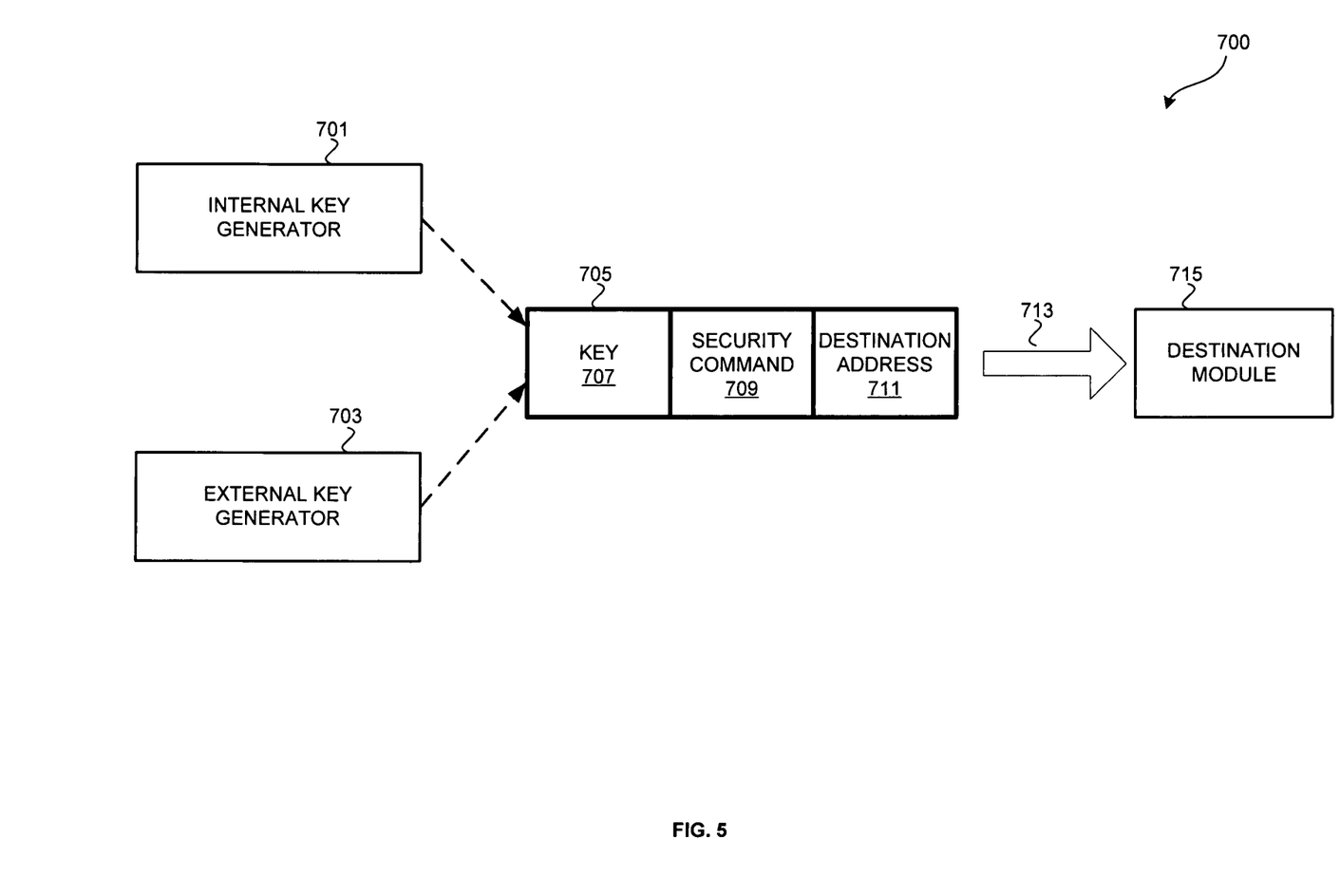
FIG. 5 is a block diagram of an exemplary system for security key generation and transmission with strong pairing to destination client, in accordance with an embodiment of the present invention.

FIG. 5 is a block diagram of an exemplary system 700 for security key generation and transmission with strong pairing to destination client, in accordance with an embodiment of the present invention. Referring to FIG. 5, the system 700 may comprise an internal key generator 701, an external key generator 703, a security key sequence 705, and a destination module 715. The security key sequence 705 may comprise a security key 707, which may be paired with a security command 709 and a destination address 711. The internal key generator 701 may be disposed within a circuit utilizing a security key, such as an application specific integrated circuit (ASIC), for example, and may comprise suitable logic, circuitry and/or code that may be adapted to generate security keys. The external key generator 703 may be disposed outside the circuit utilizing a generated security key, for example, and may comprise suitable logic, circuitry and/or code that may be adapted to generate security keys.

In operation, a security key 707 may be generated by the internal key generator 701 or by the external key generator 703. The generated security key 707 may be associated with a destination address 711 indicating the destination module 715. The key 707 and its associated destination address 711 may be paired with the security command 709 to form the security key sequence 705. The security command may comprise a rule, where the rule may be associated with characteristics of the destination module 715, for example. More specifically, the security command 709 may relate to attributes and/or permissible usages of the security key 707 that may be transmitted along with it. The security command 709 may include encryption/decryption method for which the security key 707 may be used, the size of the security key 707, and/or information on the method used to calculate the security key 707.

After the security key sequence 705 is formed, it may be communicated to the destination module 715 via the transmission bus 713. The transmission bus 713 may comprise a serial transmission bus, for example. In an aspect of the present invention, multiple destination modules may receive a security key sequence, such as the security key sequence 705, and it may be determined on the basis of the security command within the security key sequence which destination module is to process the received security key.

Strong pairing between the source of the security key 707 and the destination module 715 may be achieved by the pairing of the security key 707 and the destination address 711 with the security command 709 prior to communicating the security key sequence 705 to the destination module 715. The pairing of the security key 707 with destination-related characteristics indicated by the security command 709, may provide a strong pairing for the entire security key data path in the system 700, from generation of the security key 707, distribution (communication) of the security key 709, and use of the security key 707 by the destination module 715.

Figure 6:
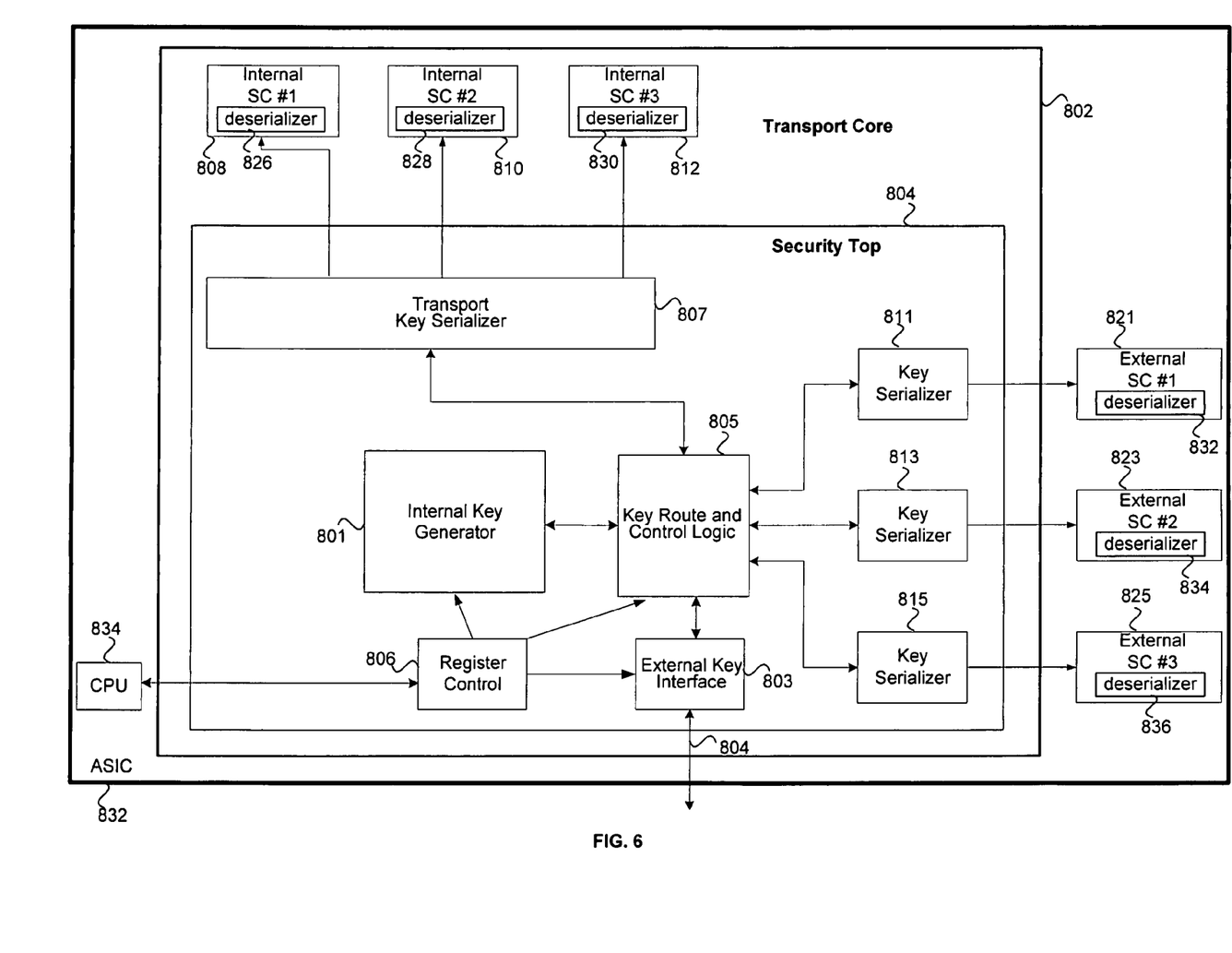
FIG. 6 is a block diagram illustrating exemplary security architecture in an application specific integrated circuit (ASIC) utilizing the security key generation and transmission system of FIG. 5, for example, in accordance with an embodiment of the present invention.

FIG. 6 is a block diagram illustrating exemplary security architecture in an application specific integrated circuit (ASIC) utilizing the security key generation and transmission system of FIG. 5, for example, in accordance with an embodiment of the present invention. Referring to FIG. 6, the ASIC 832 may comprise a CPU 834, a transport core 802, and external security clients 821, 823, and 825. The external security clients 821, 823, and 825 may comprise deserializers 832, 834, and 836, respectively. The transport core 802 may comprise a security top 804 and internal security clients 808, 810, and 812. The internal security clients 808, 810, and 812 may comprise deserializers 826, 828, and 830, respectively. The security top 804 may comprise a transport key serializer 807, an internal key generator 801, a register control 806, a key route and control logic 805, an external key interface 803, and key serializers 811, 813, and 815.

A set-top box (STB) may comprise an ASIC, such as the ASIC 832, and the ASIC may be adapted to utilize a security key generation and transmission system, such as the security key generation and transmission system of FIG. 7, to achieve strong pairing with a destination client. The ASIC 832 may comprise suitable logic, circuitry and/or code and may be adapted to handle audio/video satellite or terrestrial data, storing such data on disk, and/or displaying such data on a monitor, such as a television monitor.

The transport core 802 within the ASIC 832 may comprise suitable logic, circuitry and/or code adapted to pre-process audio/video data received from an ASIC interface, for example, or from a source such as memory (e.g., data retrieved from memory). The security top 804 within the transport core 802 may be adapted to perform security key calculation functions inside the transport core 802, such as any functions necessary to achieve strong pairing between a security key and a destination module.

The internal key generator 801 may comprise suitable logic, circuitry and/or code and may be adapted to generate security keys. Security keys may also be generated by a key generator outside the ASIC 832 and may then be communicated to the external key interface 803 via the connection 804.

The key serializers 807, 811, 813, and 815 may comprise suitable logic, code and/or circuitry for pairing a security key and its associated destination module address with a security command to form a security key sequence, and subsequently transmitting the prepared security key sequence. For example, the key serializer 811 may be adapted to transmit a 256-bit security key and the security key may be calculated 32 bits at a time. The key serializer 811, therefore, may be adapted to hold all intermediate 32-bit portions until the entire 256-bit security key is available and ready for transmission.

The address portion in each security key sequence may be configured via register writes from the CPU 834. The CPU register writes may be communicated to the key serializer 811 via the register control 806. The security command within a security key sequence prepared by a key serializer may be determined by either CPU register writes, or by hardcoding of values based on the way the security key was calculated or generated. When a segment of the security command is hardcoded, a register write may not be utilized to specify the value of that segment. For example, if a security key has been received externally via the external key interface 803, two bits in the security key command may be hardcoded to indicate the source of the security key, i.e., an external source.

The key serializers 807, 811, 813, and 815 may utilize security keys generated by the internal key generator 801 or security keys received externally via the connection 804 and the external key interface 803. The key serializers 807, 811, 813, and 815 may be separated according to the security clients that they may be adapted to service. For examples, the external security clients 821, 823, and 825 may be involved in different operations—the external security client 821 may operate a specific software, for example, related to disk drive operation, and the external security clients 823 and 825 may be involved in different operations, which may not require sharing of a key serializer resources. Therefore, for ease of software implementation, for example, each of the security clients 821, 823, and 825 may utilize its own key serializer, 811, 813, and 815, respectively.

Similarly, the internal security clients 808, 810, and 812 may require sharing of key serializer resources and, therefore, a single key serializer 807 may be provided to service the internal security clients 808, 810, and 812. In one aspect of the invention, a key serializer may be shared by several deserializers. In this case, a destination address field may be utilized to specify an intended destination of a key. A destination address may also be utilized in a configuration where one key serializer may be connected to only one key deserializer.

In another aspect of the invention, the key serializer 807 may be implemented as a plurality of separate serializers, and the key serializers 811, 813, and 815 may be implemented as a single serializer, for example.

In yet another aspect of the invention, a security command word may be utilized to invalidate a key transmitted in a prior event. In this case, a security command and an address may be specified. A transmission may be received by a key deserializer, and may be utilized to invalidate a key that may have already been transmitted to the deserializer.

Each of the security clients 808, 810, 812, 821, 823, and 825 may be utilized for encrypting and/or decrypting of data. In addition, each of the security clients 808, 810, 812, 821, 823, and 825 may comprises key deserializers 826, 828, 830, 832, 834, and 836, respectively. The key deserializers may comprise suitable logic, circuitry and/or code and may be adapted to receives a security key sequence transmission from a key serializer, and to recover (separate) the security key and the corresponding security command (or rule). After the security key and the security command are separated from the security key sequence in the deserializer, the security client may examine the security command and may determine the way the security key may be utilized and which destination module associated with the security client may utilize it. For example, a destination module associated with a security client may be adapted to utilize only internally generated security keys (i.e., security keys generated by the internal key generator 801, for example). If the security command indicates, for example, that the deserialized security key was calculated using an external key generator, the security client may then indicate that the received security key may not be utilized. In this way, strong pairing between the security key and the destination module may be accomplished.

Security clients within the ASIC 832 may be divided into internal security clients and external security clients. The internal security clients 808, 810, and 812 may be utilized for destination modules within the transport core 802, and the external security clients 821, 823, and 825 may be utilized for destination modules outside the transport core 802.

The internal security clients 808, 810, and 812 may be utilized for decrypting received data from a content provider, for example. Encrypted data may be received from a satellite or from a terrestrial cable connection, for example. In this way, the internal security clients 808, 810, and 812 may be utilized for the initial decryption of data received by the ASIC 832. In addition, the internal security clients 808, 810, and 812 may be utilized for receiving/transmitting security keys that may be required by destination modules within the transport core 802. The ASIC 832 may utilize multiple internal security clients in order to handle several encrypted data streams. For example, internal security clients 808 and 810 may be utilized to decrypt two encrypted video streams received by the ASIC 832, and the internal security client 812 may be utilized for decrypting a received audio stream.

The external security clients 821, 823, and 825 may be utilized in connection with destination modules that are outside of the transport core 802. Each of the external security clients 821, 823, and 825 may be adapted to store more than one security key for different operations. In this way, a security key table may be associated with each external security client. The destination module address portion of each deserialized security key sequence may be used to determine which part of the key table, or which destination module, to populate with the received security key transmission. The external security clients 821, 823, and 825 may also be utilized for any other encryption and/or decryption operation that may be required after received data is decrypted. Once received and encrypted data has been decrypted within the ASIC 832 with the help of a security key, there may be requirements of how a decrypted data may be stored into memory, how it may be stored on a hard disk, and how it may be transmitted over a network. For example, a subsequent encryption may be required prior to storing into memory, storing on a hard drive, or transmitting over a network. All such requirements related to the handling of data may be implemented via the security command transmitted together with the security key.

By utilizing the external security clients 821, 823, and 825, rather than the internal security clients 808, 810, and 812, hardware resources utilized to transmit a security key within the ASIC 832 may be minimized. In this way, because of decreased physical distance between the external security clients 821, 823, and 825. and other blocks within the ASIC 832, security key handling may be more efficient. The external security clients 821, 823, and 825 may also be utilized for additional system applications, for example, if decrypted data has to be stored on a disk. An external security client may then be utilized to encrypt data prior to storage. Each of the security clients within the ASIC 832, internal or external security clients, may have a different usage for a security key, and its associated security command, that have been calculated for it.

The key route and control logic 805 may be coupled to the internal key generator 801 and the external key interface 803, and may comprise suitable logic, circuitry and/or code for calculating security keys that are available for use. For example, a set of rules may be associated with the permissible ways to use security keys received from the internal key generator 801 or the external key interface 803, and a set of rules determining which destination module security keys may be sent to depending on the way the security key was generated. For example, the key route and control logic 805 may determine which key serializer within the ASIC 832 may be utilized for a specific key obtained from the external key interface 804.

The key route and control logic 805 may also provide storage for intermediate results generated by the internal key generator 801 or the external key interface 803 in the security key generation process. In addition, the key route and control logic 805 may receive status signals back from the key serializers 807, 811, 813, and 815. For example, a serializer may be in the process of transmitting a security key. During the transmission process, the serializer may also transmit a status message informing the key route and control logic 805 that a new security key may not be currently transmitted. After the serializer completes transmission of the security key, a signal may be sent back to the key route and control logic 805 indicating availability to receive a new key for transmission.

The register control 806 may be coupled to the CPU 834 and may comprise suitable logic, circuitry and/or code adapted to configure the internal key generator 801, the external key interface 803 and the key route and control logic 805 to properly complete a security key generating and serializing operation. The register control 806 may configure the operation of the internal key generator 801 before an operation is done. It may also be utilized to initiate generation of a new key. In addition, the register control 806 may be coupled to the CPU 834 inside the ASIC 832, and it may execute instructions on behalf of the CPU 834 for generation of a security key, or an intermediate security key used for subsequent security key generation, for example. The CPU 834 may provide the address portion of a security key sequence which may then be utilized by a security key serializer.

In operation, a security key may be generated by the internal key generator 801. A security key may also be generated by a source external to the ASIC 832 and then made available to the ASIC 832 via an interface, for example, the external key interface 803 and the communication path 804. The security key may be assembled via the key route and control logic 805 and may then be distributed to the appropriate destinations via a specialized security key transmission bus, utilizing the transport key serializer 807, and/or key serializers 811, 813, and/or 815. The key serializers 807, 811, 813, and 815 may be utilized to pair the security key and its associated destination module address with a security command to obtain a security key sequence. The key serializers 807, 811, 813, and 815 may then communicate the security key sequence to an internal security client, such as clients 808, 810, and 812, and/or an external security client, such as clients 821, 823, and 825. The key serializers 811, 813, and 815 may comprise, for example, a MEM-MEM key serializer, a MEM-IDE key serializer, and/or a HDMI key serializer. The external security clients 821, 823, and 825 may comprise, for example, a MEM-MEM, a MEM-IDE, and/or a HDMI security clients. U.S. application Ser. No. 10/414,844 filed Mar. 14, 2003 discloses a MEM-3DES-MEM system and is hereby incorporated herein by reference in its entirety. U.S. application Ser. No. 10/414,575 filed Mar. 14, 2003 discloses a MEM-3DES-IDE system and is hereby incorporated herein by reference in its entirety.

In an embodiment of the present invention, strong pairing between a security key and a destination may be achieved by pairing a security command (or a data-structure) with the security key and its associated security address to form a security key sequence. The security key sequence may then be transmitted to a destination client. The destination module may then utilize the security key and proceed based on control information contained in the attached data-structure. The data structure may comprise control information, such as, for example, the algorithm type associated with the destination module, size of the security key, and source of the security key. When a destination module receives a security key, it may compare the attached security command (or data-structure) with the selected algorithm configuration. If the algorithm configuration does not match with the security key data-structure, the destination module may report an error and/or initiate an action. For example, the destination module may report corruption of data, and/or initiate an action to resolve the corrupted data.

In an embodiment of the present invention, a security key, its associated destination module address, and the tagged security command (or data-structure) may be transmitted serially to the destination module via a specialized serial bus.

Figure 7:
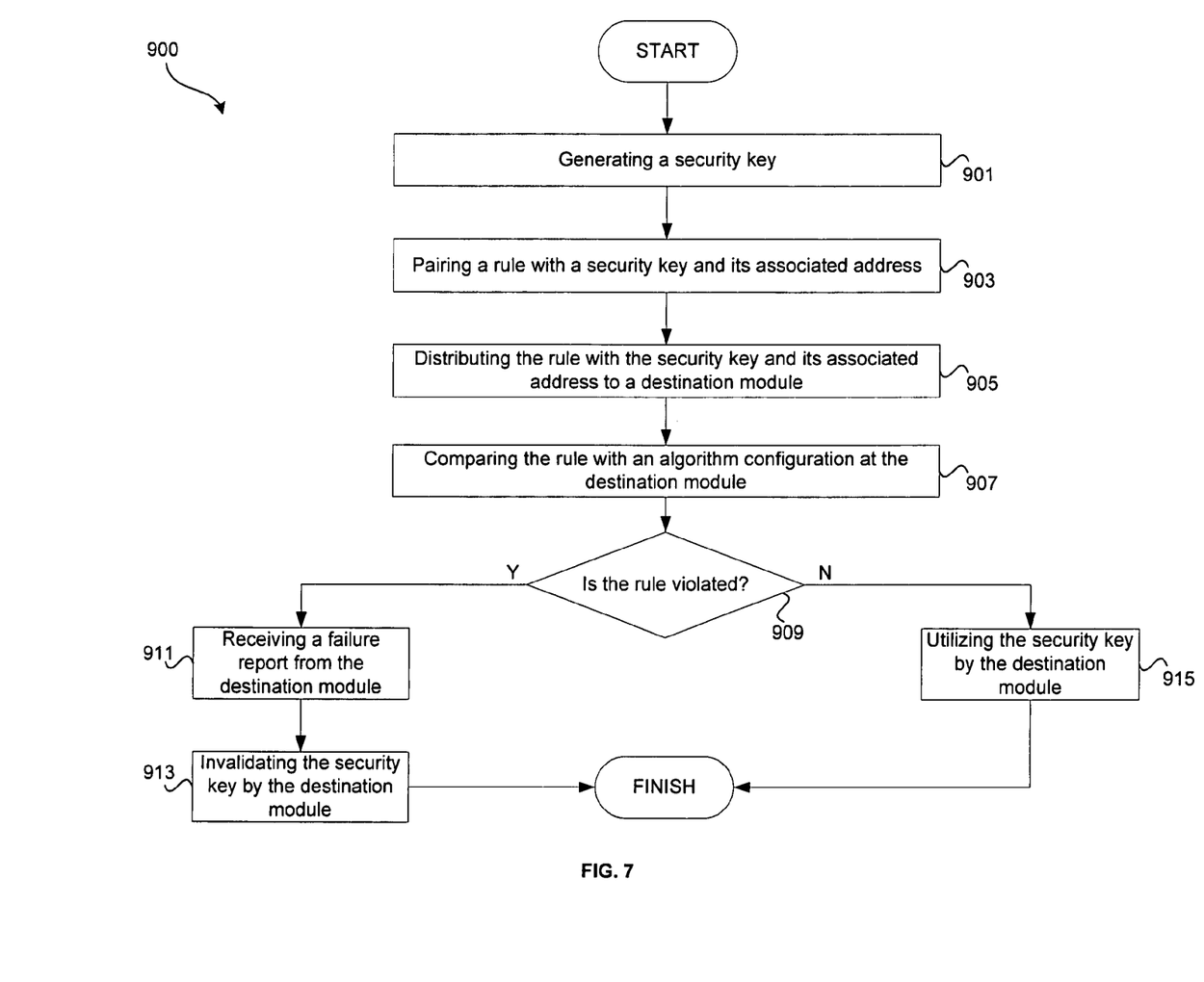
FIG. 7 is a flow diagram of a method for security key transmission with strong pairing to destination client, in accordance with an embodiment of the present invention.

FIG. 7 is a flow diagram of a method 900 for security key transmission with strong pairing to destination client, in accordance with an embodiment of the present invention. At 901, a security key may be generated. For example, a security key may be generated by an internal key generator on a chip, and/or by an external key generator outside the chip utilizing security key transmission with strong pairing. In addition, a security key may be associated with a destination module address indicating a destination module within or outside the chip. At 903, the generated security key and its associated destination module address may be paired with a rule. The rule may comprise a security command and/or a data-structure.

At 905, the rule, together with the security address and its associated destination module address, may be distributed to a destination module. At 907, the rule may be compared with an algorithm configuration at the destination module. At 909, it may be determined whether the rule has been violated. If the rule has been violated, at 911, a failure report may be received from the destination module. At 913, the security key may be invalidated by the destination module. If the rule has not been violated, at 915, the security key may be utilized by the destination module.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for security key transmission, the method comprising:
generating, by at least one processor in an integrated circuit, a security key sequence comprising a security key, a security command comprising an algorithm associated with the security key, and an address associated with a destination module;
sending, by the processor, the security key sequence to the destination module; and
receiving, by the processor, an error message from the destination module in response to the algorithm being different than an algorithm configuration of the destination module.

2. The method of claim 1, wherein the security command defines permissible usage by the destination module.

3. The method of claim 1, further comprising:
sending, by the processor, a command word to the destination module.

4. The method of claim 3, wherein the command word comprises instructions for the destination module to invalidate the security key.

5. The method of claim 1, wherein the security command further comprises a security key size and a security key source.

6. The method of claim 1, wherein the security command indicates whether the destination module is authorized to use the security key.

7. The method of claim 1, further comprising:
generating the security key by a key generator disposed in the integrated circuit, an external key generator, or software.

8. The method of claim 1, further comprising:
serially transmitting, by the processor, the security key sequence to the destination module.

9. The method of claim 1, further comprising:
comparing, by the destination module, the algorithm with the algorithm configuration of the destination module.

10. The method of claim 9, further comprising:
sending, by the destination module, the error message to the processor in response to the algorithm being different than the algorithm configuration of the destination module.

11. The method of claim 9, further comprising:
invalidating, by the destination module, the security key in response to the algorithm being different than the algorithm configuration of the destination module.

12. A non-transitory machine-readable storage having stored thereon, a computer program having at least one code section for security key transmission, the at least one code section being executable by a machine for causing the machine to perform steps comprising:
generating a security sequence comprising a security key, a security command comprising an algorithm associated with the security key, and an address associated with a destination module;

sending the security sequence to the destination module; and receiving an error message from the destination module in response to the algorithm being different than an algorithm configuration of the destination module.

13. The non-transitory machine-readable storage of claim 12, wherein the security command defines permissible usage by the destination module.

14. The non-transitory machine-readable storage of claim 12, the steps further comprising:

sending a command word to the destination module.

15. The non-transitory machine-readable storage of claim 12, wherein the command word comprises instructions for the destination module to invalidate the security key.

16. The non-transitory machine-readable storage of claim 12, wherein the security command further comprises a security key size and a security key source.

17. The non-transitory machine-readable storage of claim 12, wherein the security command indicates whether the destination module is authorized to use the security key.

18. The non-transitory machine-readable storage of claim 12, the steps further comprising generating the security key by a key generator disposed in the integrated circuit, an external key generator, or software.

19. The non-transitory machine-readable storage of claim 12, the steps further comprising:

serially transmitting the security key sequence to the destination module.

20. The non-transitory machine-readable storage of claim 12, the steps further comprising:

comparing the algorithm with the algorithm configuration of the destination module.

21. The non-transitory machine-readable storage of claim 20, the steps further comprising:

generating the error message to the processor in response to the algorithm being different than the algorithm configuration of the destination module.

22. The non-transitory machine-readable storage of claim 20, the steps further comprising:

invalidating the security key in response to the algorithm being different than the algorithm configuration of the destination module.

23. A system for security key transmission, the system comprising:

at least one processor in an integrated circuit that is configured to generate a security key sequence comprising a security key, a security command comprising an algorithm associated with the security key, and an address associated with a destination module, wherein the processor is further configured to:

send the security key sequence to the destination module, and receive an error message from the destination module in response to the algorithm being different than an algorithm configuration of the destination module.

24. The system of claim 23, wherein the security command defines permissible usage by the destination module.

25. The system of claim 23, wherein the processor is further configured to send a command word to the destination module.

26. The system of claim 25, wherein the command word comprises instructions for the destination module to invalidate the security key.

27. The system of claim 23, wherein the security command further comprises a security key size and a security key source.

28. The system of claim 23, wherein the security command indicates whether the destination module is authorized to use the security key.

29. The system of claim 23, further comprising a generator for generating the security key.

30. The system of claim 29, wherein the generator comprises a key generator disposed in the integrated circuit, an external key generator, or software.

31. The system of claim 23, wherein the processor is further configured to serially transmit the security key sequence to the destination module.

32. The system of claim 23, further comprising a destination module processor configured to compare the algorithm with the algorithm configuration of the destination module.

33. The system of claim 32, wherein the destination module processor is further configured to send the error message to the processor in response to the algorithm being different than the algorithm configuration of the destination module.

34. The system of claim 32, wherein the destination module processor is further configured to invalidate the security key in response to the algorithm being different than the algorithm configuration of the destination module.

* * * * *